United States Patent [19]

Schulz et al.

[11] 4,223,103
[45] Sep. 16, 1980

[54] POLYPHOSPHAZENE POLYMERS CONTAINING SUBSTITUENTS DERIVED FROM THIENYL ALCOHOLS

[75] Inventors: Donald N. Schulz, Hartville; Jung W. Kang, Clinton, both of Ohio

[73] Assignee: The Firestone Tire & Rubber Company, Akron, Ohio

[21] Appl. No.: 15,378

[22] Filed: Feb. 26, 1979

[51] Int. Cl.³ .................... C08G 79/02; C08G 73/00
[52] U.S. Cl. .................................. 528/168; 528/378; 528/380; 528/399
[58] Field of Search ............... 528/168, 378, 380, 399

[56] References Cited

U.S. PATENT DOCUMENTS

| 2,721,870 | 10/1955 | Pines ................................. 528/380 |
| 4,107,146 | 8/1978 | Dieck et al. ........................ 528/399 |

Primary Examiner—Wilbert J. Briggs, Sr.

[57] ABSTRACT

Polyphosphazene polymers are prepared which contain units represented by the formulas:

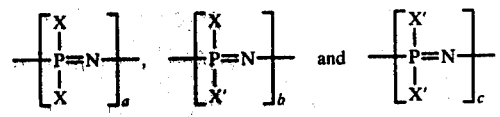

wherein X is

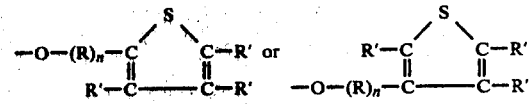

in which R is alkylene radical containing from 0 to 10 carbon atoms, R' is hydrogen or alkyl containing from 1 to 10 carbon atoms and n is an integer of from 0 to 10; wherein X' is X or is selected from the group consisting of substituted or unsubstituted alkoxy, aryloxy, amino and mercapto groups and wherein $20 \leq (a+b+c) \leq 50{,}000$ per polymer.

The polymers of the invention can be utilized to form films and may also be utilized in applications such as moldings, coatings, foams and the like.

12 Claims, No Drawings

POLYPHOSPHAZENE POLYMERS CONTAINING SUBSTITUENTS DERIVED FROM THIENYL ALCOHOLS

BACKGROUND OF THE INVENTION

This invention relates to polyphosphazene polymers containing repeating

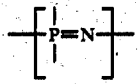

units in the polymer chain in which substituents derived from thienyl alcohols are attached to the phosphorus atom. More particularly, the invention relates to homopolymers containing substituents having the structure:

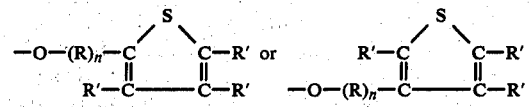

(defined hereinafter) and to copolymers containing such substituents along with other compatible substituents.

Polyphosphazene polymers containing repeating

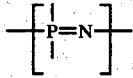

units in which various alkoxy, substituted alkoxy, aryloxy, substituted aryloxy, amino and mercapto groups are attached to the phosphorus atom and their method of preparation are described in the prior art as illustrated in the publication "Phosphorus-Nitrogen Compounds", Academic Press, New York, New York, 1972 by H. R. Allcock and "Poly(Organophosphazenes)", Chemtech, Sept. 19, 1975 by H. R. Allcock and in such U.S. Pat. Nos. as 3,515,688; 3,702,833; 3,856,712; 3,974,242 and 4,042,561, the disclosures of which are incorporated herein by reference.

In addition, polyphosphazene copolymers containing small amounts of monoethylenically unsaturated substituents which are capable of undergoing further reaction (i.e. crosslinking) at temperatures ranging from 200° to 350° F. are known in the prior art as illustrated by U.S. Pat. Nos. 3,702,833; 3,844,983; 3,888,799 and 4,055,520. As described in the aforementioned patents, these reactive unsaturated substituents may be unsaturated monovalent radicals such as $$-OCH=CH_2; -ORCH=CH_2; -OC=CH_2;$$
$$\qquad\qquad\qquad\qquad\qquad\qquad\ \ |$$
$$\qquad\qquad\qquad\qquad\qquad\qquad\ \ R$$
$$-ORCF=CF_2 \text{ and } -OCH_2RC=CF_2,$$

where R is an aliphatic or aromatic radical.

The polymers described in the above patents exhibit a number of advantageous properties as a result of the inclusion of small amounts of the above described unsaturated substituents therein. Thus, such polymers where crosslinked are often useful as solvent and chemically resistant coatings, sealants, potting compounds and the like.

However, as indicated, polymers containing such unsaturated substituents generally require elevated temperatures in the range of 200° to 350° F. to affect crosslinking. In contrast, the polymers of this invention can be cured or crosslinked at ambient temperatures with curing agents such as salts of bi- or -polyvalent metals. Especially advantageous metallic salts of this type are metallic halides.

SUMMARY OF THE INVENTION

In accordance with this invention, polyphosphazene polymers are prepared which contain substituents derived from thienyl alkanols. These polymers contain units represented by the formulas:

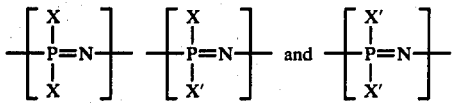

wherein X is:

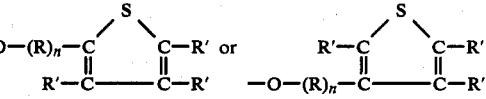

in which R is an alkylene radical containing from 0 to 10 carbon atoms, R' is hydrogen or alkyl containing from 1 to 10 carbon atoms and n is an integer from 0 to 10; wherein X' is X or is selected from the group consisting of substituted or unsubstituted alkoxy, aryloxy, amino and mercapto groups and wherein $20 \leq (a+b+c) \leq 50,000$ per polymer.

As will be evident from the above formulas, when X and X' are the same, homopolymers are formed whereas when X and X' are different, copolymers are formed.

In the copolymer units represented by the above formulas, all X substituent groups may be the same or they may be mixed and all X' substituent groups may be the same or mixed. In the mixtures, the X substituent groups may be mixtures of substituent groups derived from different thienyl alcohols and the X' substituent groups may be mixtures of alkoxy, aryloxy, amino and mercaptan groups or mixtures of different groups within each class (i.e. different alkoxy, aryloxy etc.).

The specific proportion of X to X' substituent groups incorporated in the polymers of the invention may vary considerably depending upon the particular end use for which the copolymer is intended and the chemical and physical properties desired. Thus, for applications such as moldings, coatings, foams and the like, the polymer should contain at least 0.5 mole percent of the X substituent.

The polymers are prepared by reacting a poly-(dichlorophosphazene) having the formula —(NPCl$_2$)$_n$— in which n is from 20 to 50,000 with a thienyl alcohol or mixture of thienyl alcohols and if copolymers are desired a substituted or unsubstituted aliphatic alcohol, aromatic alcohol, amino compound or mercaptan compound in the presence of a tertiary amine. An especially useful thienyl alcohol is 2(2-thienyl)-ethanol.

DETAILED DESCRIPTION OF THE INVENTION

The term "polymer" as employed hereinafter throughout the specification and claims is utilized in its broad sense and includes homopolymers, copolymers, terpolymers and the like.

I. THE POLY (DICHLOROPHOSPHAZENE) POLYMER

Poly (dichlorophosphazene) polymers which are employed as starting materials in preparing the polymers of this invention are well known in the art as illustrated in U.S. Pat. Nos. 3,370,020; 4,005,171; and 4,055,520, the disclosures of which are incorporated herein by reference.

These polymers have the general formula $-(NPCl_2)_n-$ in which n may range from 20 to 50,000 or more. As described in the aforementioned references, the polymers are in general prepared by the thermal polymerization of cyclic oligomers having the formula $-(NPCl_2)_n-$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures from a vacuum of less than about $10^{-1}$ Torr to superatmospheric and times may range from 30 minutes to about 48 hours.

A preferred process for preparing the poly (dichlorophosphazene) polymers used in the process of this invention is described in the aforementioned incorporated U.S. Pat. No. 4,005,171.

II. THE SUBSTITUENTS DERIVED FROM THIENYL ALCOHOLS

Thienyl alcohols which may be employed in forming the X substituent are those represented by the structure:

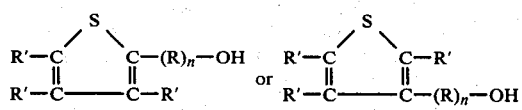

in which R is an alkylene radical containing from 0 to 10 carbon atoms, R' is hydrogen or alkyl containing from 1 to 10 carbon atoms and n is an integer of from 0 to 10.

Illustrative examples of thienyl alcohols which may be employed in forming the polymers of the invention include thiophene-2-ol (2-hydroxythiophene), thiophene-3-ol (3-hydroxythiophene), 2-(2-thienyl)-ethanol, 2-(4-methyl-2-thienyl)-ethanol, 2-(5-t-butyl-2-thienyl)-ethanol and the like.

III. THE ALKOXY, ARYLOXY, AMINO AND MERCAPTO SUBSTITUENTS

As indicated heretofore, the polyphosphazene polymers of the invention in additon to the X substituent group (i.e. the substituent group derived from thienyl alcohols) may contain, as the X' substituent group, substituted or unsubstituted alkoxy, aryloxy, amino or mercapto groups.

The alkoxy groups (substituted or unsubstituted) may be derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines, such as those described in U.S. Pat. No. 4,042,561, incorporated herein by reference, as illustrated by aniline, halogen-substituted anilines, alkyl-substituted anilines, alkoxy-anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

The preferred substituent group represented by X' for use in the polymers of the invention are alkoxy groups, especially fluoroalkoxy groups and aryloxy groups.

As mentioned heretofore, the polymers of the invention are prepared by reacting the poly (dichlorophosphazene) polymer, the thienyl alcohol, and if desired, other reactants (e.g. aliphatic or aromatic alcohol, amino compound, mercaptan compound etc.) in the presence of a tertiary amine.

IV. THE TERTIARY AMINE

The use of the tertiary amine in preparing the polymers of the invention minimizes undesirable side reactions and at the same time acts as an effective acid scavenger.

Tertiary amines which may be employed in preparing the polymers of the invention are those represented by the general structure:

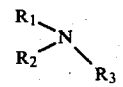

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like.

In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

The specific reaction conditions and proportion of ingredients employed in preparing these polymers can vary somewhat depending on factors such as the reactivity of the specific substituent or substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e., in order to insure substantially complete conversion of the chlorine atoms in the polymer to the corresponding ester of the substituent mixture.

The above reaction is ordinarily carried out in the presence of a solvent. The solvent or solvent mixture employed in the reaction should be a solvent for the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent or solvent mixture employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

As indicated, a particularly useful feature of the polymers of the invention is that they can be cured at ambient temperature (i.e., 25° C.) with salts of bivalent or polyvalent metals especially metal halides such as $CaCl_2$, $NiCl_2$, $ZnCl_2$ and the like.

The following examples are submitted for the purpose of further illustrating the nature of the present invention and is not intended as a limitation on the scope thereof. Parts and percentages referred to in the examples are by weight unless otherwise indicated.

EXAMPLE 1

Preparation of

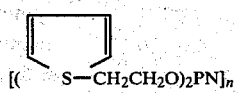

$[( \quad S-CH_2CH_2O)_2PN]_n$

Homopolymers

To a 10 oz. bottle was charged 100 cc of tetrahydrofuran (hereinafter THF), 12.2 ml of triethylamine (88 millimoles), 9.8 ml (88 millimoles) of 2-(2-thienyl)-ethanol and 37.4 grams (40 millimoles) of a 12.3 percent solids solution of poly(dichlorophosphazene) in THF. The reaction mixture was then heated for 63.5 hours at 120° C. Upon cooling, a solution containing needles of triethylamine hydrochloride was observed. The solution was then filtered to remove the triethylamine hydrochloride. A sample of the filtrate was then cast as a film and permitted to dry. The dried film had a pencil hardness of <HB.

A sample of the filtrate was then coagulated in water and the resultant polymeric product was recovered from the water and dried.

The polymeric product was tested and showed a Tg of 35° C. and a Tm of 128° C. Microanalysis of the polymeric product showed the following values:

|  | C | H | P | N | S | Cl |
|---|---|---|---|---|---|---|
| Calculated* (%): | 44.71 | 5.03 | 11.95 | 5.97 | 18.22 | 1.84 |
| Actual (%): | 45.45 | 5.37 | 11.43 | 6.29 | 16.50 | 0.07 |

*Based upon 85.07% polyphosphazene, 7.18% triethylamine hydrochloride and 7.11% hydrolyzed product.

EXAMPLE 2

Preparation of

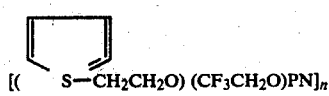

$[( \quad S-CH_2CH_2O)(CF_3CH_2O)PN]_n$

Copolymers

To a 10 oz. bottle was charged 100 cc of dry toluene, 12.2 ml of triethylamine (88 millimoles), 4.9 ml (44 millimoles) of 2-(2-thienyl)-ethanol, 3.4 ml (44 millimoles) of trifluoroethanol and 46 ml (41.6 grams) of a 10.25 percent solids poly(dichlorophosphazene) (36.8 millimoles) solution in toluene. The reaction mixture was then heated for 23.5 hours at 80° C. followed by additional heating for 23 hours at 120° C.

The resultant product was filtered to remove triethylamine hydrochloride and a film was cast from a sample of the filtrate as in Example 1. The dried film had a pencil hardness of HB.

Analysis of the polymeric product obtained after coagulation from water showed the following:

|  | C | H | N | P | S | Cl |
|---|---|---|---|---|---|---|
| Calculated* (%) | 28.26 | 3.33 | 6.85 | 14.78 | 11.00 | 0.41 |
| Actual (%) | 28.24 | 3.75 | 7.39 | 14.51 | 10.97 | 0.05 |

*Based upon a copolymer containing 79.03 %

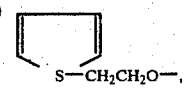

$S-CH_2CH_2O-$, 20.97% $CF_3CH_2O-$ plus 19.72% hydrolyzed product and 1.6% residual triethylamine hydrochloride.

Thermal analysis (DTA) of the polymeric product showed a Tg of −8° C., Tm's at 220°–240° C. and shoulders at 271° C. and 328° C.

EXAMPLE 3

Preparation of

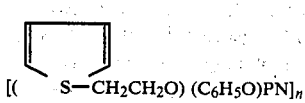

Copolymer

To a 10 oz. bottle was charged 100 cc of dry THF, 12.2 ml of triethylamine (88 millimoles), 4.9 ml (44 millimoles) of 2-(2-thienyl)-ethanol, 10.7 grams (44 millimoles) of a 39 percent solids solution of phenol in THF and 47.1 grams of a 9.7 percent solids solution of poly(dichlorophosphazene) (39 millimoles) in THF. The reaction mixture ws then heated for 173 hours at 120° C. The resultant product was filtered to remove triethylamine hydrochloride and a film was cast from a sample of the filtrate as in Example 1. The dried film has a pencil hardness of <HB.

Analysis of the polymeric product obtained after coagulating the filtrate in water showed the following:

|  | C | H | N | P | Cl |
|---|---|---|---|---|---|
| Calculated* (%) | 49.75 | 4.68 | 4.82 | 10.66 | 0 |
| Actual (%) | 49.24 | 5.30 | 7.14 | 12.42 | 0.89 |

*based upon a copolymer containing 90%

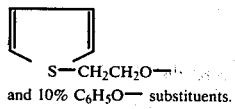

and 10% C$_6$H$_5$O— substituents.

The following example (i.e. Ex. 4) illustrates the curability of polymers of the invention with metal halides.

EXAMPLE 4

A sample of the polyphosphazene polymer of Example 2 was dissolved in methanol. To this polymer solution was added aqueous CaCl$_2$ such that the ratio of polymer to CaCl$_2$ present in the solution was 5 to 1. The polymer crosslinked at ambient temperature (i.e. 25° C.) very rapidly as indicated by precipitation of the polymers from solution. A sample of the crosslinked polymer was analyzed by atomic adsorption analysis and found to contain 4.1% calcium. Thermal analysis (DTA) of the crosslinked polymers showed Tg's of −23.5° C. and 16° C. and Tm's at 37, 132 and 214° C.

The above example illustrates that polymers of the invention can be readily cured at ambient temperature with crosslinking agents such as metal halides.

We claim:

1. A polyphosphazene polymer containing units represented by the formulas:

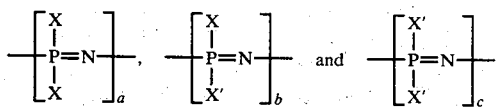

wherein X is

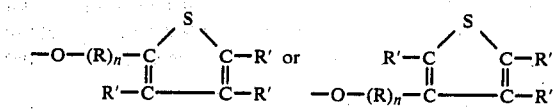

in which R is an alkylene radical containing from 0 to 10 carbon atoms, R' is hydrogen or alkyl containing from 1 to 10 carbon atoms and n is an integer of from 0 to 10; wherein X' is X or is selected from the group consisting of substituted or unsubstituted alkoxy, aryloxy, amino and mercapto groups and wherein $20 \leq (a+b+c) \leq 50,000$ per polymer.

2. The polymer of claim 1 wherein X and X' are

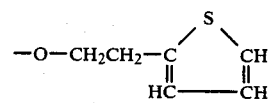

3. The polymer of claim 1 wherein X is

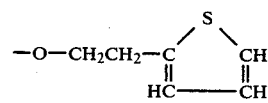

and X' is —OCH$_2$CF$_3$.

4. The polymer of claim 1 wherein X is

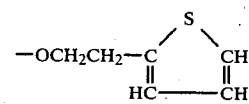

and X' is —OC$_6$H$_5$.

5. A method of preparing polyphosphazene polymers containing units represented by the formulas:

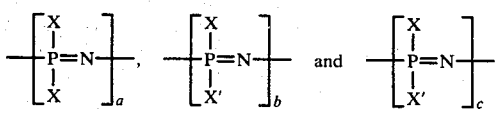

wherein X is

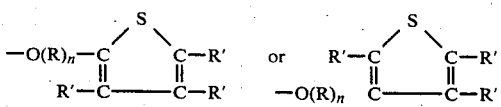

in which R is an alkylene radical containing from 0 to 10 carbon atoms, R' is hydrogen or alkyl containing from 1 to 10 carbon atoms and n is an integer from 0 to 10; wherein X' is X or is selected from the group consisting of substituted or unsubstituted alkoxy, aryloxy, amino and mercapto groups and wherein $20 \leq (a+b+c) \leq 50,000$ per polymer; said method comprising reacting a poly(dichlorophosphazene) having the formula —(NPCl$_2$)$_n$—, in which n is from 20 to 50,000 with a thienyl alcohol having the structure

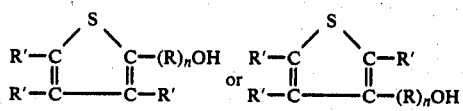

in which R, R' and n are as defined above or a mixture of said thienyl alcohols and a compound selected from the group consisting of an aliphatic alcohol, aromatic alcohol, amino compound or mercaptan compound in the presence of a tertiary amine.

6. The method of claim 5 wherein said thienyl alcohol is 2-(2-thienyl)-ethanol.

7. The method of claim 5 wherein said mixture is a mixture of 2-(2-thienyl)-ethanol and trifluoroethanol.

8. The method of claim 5 wherein said mixture is a mixture of 2-(2-thienyl)-ethanol and phenol.

9. The method of claim 5 wherein said tertiary amine is triethylamine.

10. A method of curing a polyphosphazene polymer containing a thienyl substituent which comprises reacting said polymer with a salt of a bivalent or polyvalent metal at ambient temperature.

11. The method of claim 10 wherein said thienyl substituent is:

and said salt is a metal halide.

12. The method of claim 11 wherein said metal halide is $CaCl_2$.

* * * * *